United States Patent
Choi

(10) Patent No.: US 10,864,866 B2
(45) Date of Patent: Dec. 15, 2020

(54) VEHICLE AND CONTROL METHOD THEREOF

(71) Applicants: Hyundai Motor Company, Seoul (KR); Kia Motors Corporation, Seoul (KR)

(72) Inventor: Yeonhee Choi, Yangsan-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 227 days.

(21) Appl. No.: 15/972,715

(22) Filed: May 7, 2018

(65) Prior Publication Data

US 2019/0176730 A1 Jun. 13, 2019

(30) Foreign Application Priority Data

Dec. 7, 2017 (KR) .................. 10-2017-0167103

(51) Int. Cl.
*B60R 16/037* (2006.01)
*B60H 1/00* (2006.01)

(52) U.S. Cl.
CPC ....... *B60R 16/037* (2013.01); *B60H 1/00742* (2013.01); *B60H 1/00878* (2013.01); *B60H 1/00971* (2013.01)

(58) Field of Classification Search
CPC ............ B60H 1/00971; B60H 1/00878; B60H 1/00742; B60H 1/00792; B60R 16/037
See application file for complete search history.

(56) References Cited

U.S. PATENT DOCUMENTS

| 5,559,504 A * | 9/1996 | Itsumi ................. G01B 7/32 340/5.53 |
| 6,100,811 A * | 8/2000 | Hsu ................. B60H 1/00642 340/426.36 |
| 8,188,406 B2 | 5/2012 | Asami et al. |
| 2004/0232229 A1 * | 11/2004 | Gotfried .............. B60R 25/252 235/382 |
| 2007/0205876 A1 * | 9/2007 | Nguyen ................ B60R 25/00 340/426.12 |
| 2008/0252412 A1 * | 10/2008 | Larsson ............... B60R 25/252 340/5.2 |
| 2012/0226413 A1 * | 9/2012 | Chen ....................... G06F 7/02 701/36 |

(Continued)

FOREIGN PATENT DOCUMENTS

| JP | 2007290685 A | 11/2007 |
| JP | 2010101525 A | 5/2010 |

(Continued)

*Primary Examiner* — Mussa A Shaawat
(74) *Attorney, Agent, or Firm* — Slater Matsil, LLP

(57) ABSTRACT

A vehicle includes a detector configured to detect a fingerprint of a user and a temperature of the finger. A storage medium is configured to store a user set value corresponding to the detected fingerprint and temperature set value data corresponding to the detected temperature. A controller is configured to control an electronic device in the vehicle based on a user set value corresponding to the detected fingerprint when the user set value exists, and to control an air conditioner based on a temperature set value corresponding to the detected temperature when there are more than a predetermined number of temperature set value data stored.

20 Claims, 6 Drawing Sheets

(56) References Cited

U.S. PATENT DOCUMENTS

| | | | |
|---|---|---|---|
| 2013/0144470 A1* | 6/2013 | Ricci | G06F 16/24 |
| | | | 701/2 |
| 2014/0306826 A1* | 10/2014 | Ricci | G06Q 10/02 |
| | | | 340/573.1 |
| 2015/0053066 A1* | 2/2015 | Hampiholi | G10H 1/0008 |
| | | | 84/602 |
| 2015/0217726 A1* | 8/2015 | Lee | B60K 28/02 |
| | | | 701/1 |
| 2016/0173568 A1* | 6/2016 | Penilla | G06Q 10/10 |
| | | | 709/217 |
| 2016/0272214 A1 | 9/2016 | Chen | |
| 2018/0012433 A1* | 1/2018 | Ricci | G06Q 20/32 |
| 2018/0141408 A1* | 5/2018 | Filipkowski | B60H 1/00771 |
| 2018/0302751 A1* | 10/2018 | Coutinho | G01S 5/0036 |
| 2018/0357233 A1* | 12/2018 | Daze | G06F 16/44 |
| 2019/0036946 A1* | 1/2019 | Ruvio | H04W 4/44 |
| 2019/0258246 A1* | 8/2019 | Liu | G05D 1/0027 |
| 2020/0104326 A1* | 4/2020 | Ricci | H04L 63/0428 |

FOREIGN PATENT DOCUMENTS

| | | |
|---|---|---|
| JP | 2011213330 A | 10/2011 |
| KR | 20150108138 A | 9/2015 |

\* cited by examiner

VEHICLE AND CONTROL METHOD THEREOF

CROSS-REFERENCE TO RELATED APPLICATIONS

This application claims priority to Korean Patent Application No. 10-2017-0167103, filed in the Korean Intellectual Property Office on Dec. 7, 2017, which application is hereby incorporated herein by reference.

TECHNICAL FIELD

The present disclosure relates to a vehicle and a control method thereof.

BACKGROUND

Vehicles basically run on the road but also provide various user-convenient functions, such as audio play, video play, navigation, Air Conditioning (AC) and ventilation, seat control, lighting control, etc.

When it comes to the vehicle providing such various functions, the function needs to be customized for individual users and provided by considering the physical condition of each user.

SUMMARY

The present disclosure provides a vehicle and control method thereof, which is capable of controlling an electronic device that provides various user-convenient functions based on the user's fingerprint and temperature detected by sensors.

In accordance with one aspect of the present disclosure, a vehicle comprises a detector configured to detect a fingerprint of a user and a temperature of the finger. A storage is configured to store a user set value corresponding to the detected fingerprint and temperature set value data corresponding to the detected temperature. A controller is configured to control an electronic device in the vehicle based on a user set value corresponding to the detected fingerprint when the user set value exists, and to control an air conditioner based on a temperature set value corresponding to the detected temperature when there are more than a predetermined number of temperature set value data stored.

The detector may be provided on a steering wheel.

The storage may store a user set value including at least one of a seat value and a side mirror value corresponding to the detected fingerprint, and the controller may control a seat based on a seat value corresponding to the detected fingerprint when the seat value exists and control a side mirror based on a side mirror value corresponding to the detected fingerprint when the side mirror value exists.

The controller may, when there are more than a predetermined number of temperature set value data stored, calculate a correlation between the detected temperature and the corresponding temperature set value.

The controller may determine a temperature set value corresponding to the detected temperature based on the calculated correlation, and control the air conditioner based on the determined temperature set value.

The controller may control the detector to detect a temperature of the finger at predetermined intervals.

The controller may control the air conditioner based on a temperature set value corresponding to the temperature detected at the predetermined intervals.

The vehicle may further comprise an input device configured to receive a command to register the detected fingerprint. The controller may, when there is no user set value corresponding to the detected fingerprint, register the detected fingerprint based on whether the command to register the detected fingerprint is input.

The controller may, when the command to register the detected fingerprint is input, register the detected fingerprint and store a user set value including at least one of a seat value and a side mirror value.

The controller may update the stored user set value when the user set value is changed.

In accordance with another aspect of the present disclosure, a control method of a vehicle comprises detecting a fingerprint of a user and a temperature of the finger. A user set value corresponding to the detected fingerprint and temperature set value data corresponding to the detected temperature are stored. An electronic device in the vehicle is controlled based on a user set value corresponding to the detected fingerprint when the user set value exists. An air conditioner is controlled based on a temperature set value corresponding to the detected temperature when there are more than a predetermined number of temperature set value data stored.

The storing of the user set value and the temperature set value data may comprise storing a user set value including at least one of a seat value and a side mirror value corresponding to the detected fingerprint. The controlling of the electronic device may comprise controlling a seat based on a seat value corresponding to the detected fingerprint when the seat value exists and controlling a side mirror based on a side mirror value corresponding to the detected fingerprint when the side mirror value exists.

The controlling of the air conditioner may comprise, when there are more than a predetermined number of temperature set value data stored, calculating a correlation between the detected temperature and the corresponding temperature set value.

The controlling of the air conditioner may comprises determining a temperature set value corresponding to the detected temperature based on the calculated correlation; and controlling the air conditioner based on the determined temperature set value.

The control may further comprise detecting a temperature of the finger at predetermined intervals.

The controlling of the air conditioner may comprise controlling the air conditioner based on a temperature set value corresponding to the temperature detected at the predetermined intervals.

The control method may further comprise receiving a command to register the detected fingerprint. When there is no user set value corresponding to the detected fingerprint, the detected fingerprint is registered based on whether the command to register the detected fingerprint is input.

The registering of the detected fingerprint may comprise, when the command to register the detected fingerprint is input, registering the detected fingerprint, and storing a user set value including at least one of a seat value and a side mirror value.

The control method may further comprise updating the stored user set value when the user set value is changed.

The detecting of the fingerprint of the user and the temperature of the finger may comprise detecting a fingerprint of a user and a temperature of the finger when the vehicle is started.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 4, which includes

DETAILED DESCRIPTION OF ILLUSTRATIVE EMBODIMENTS

Figure 1:
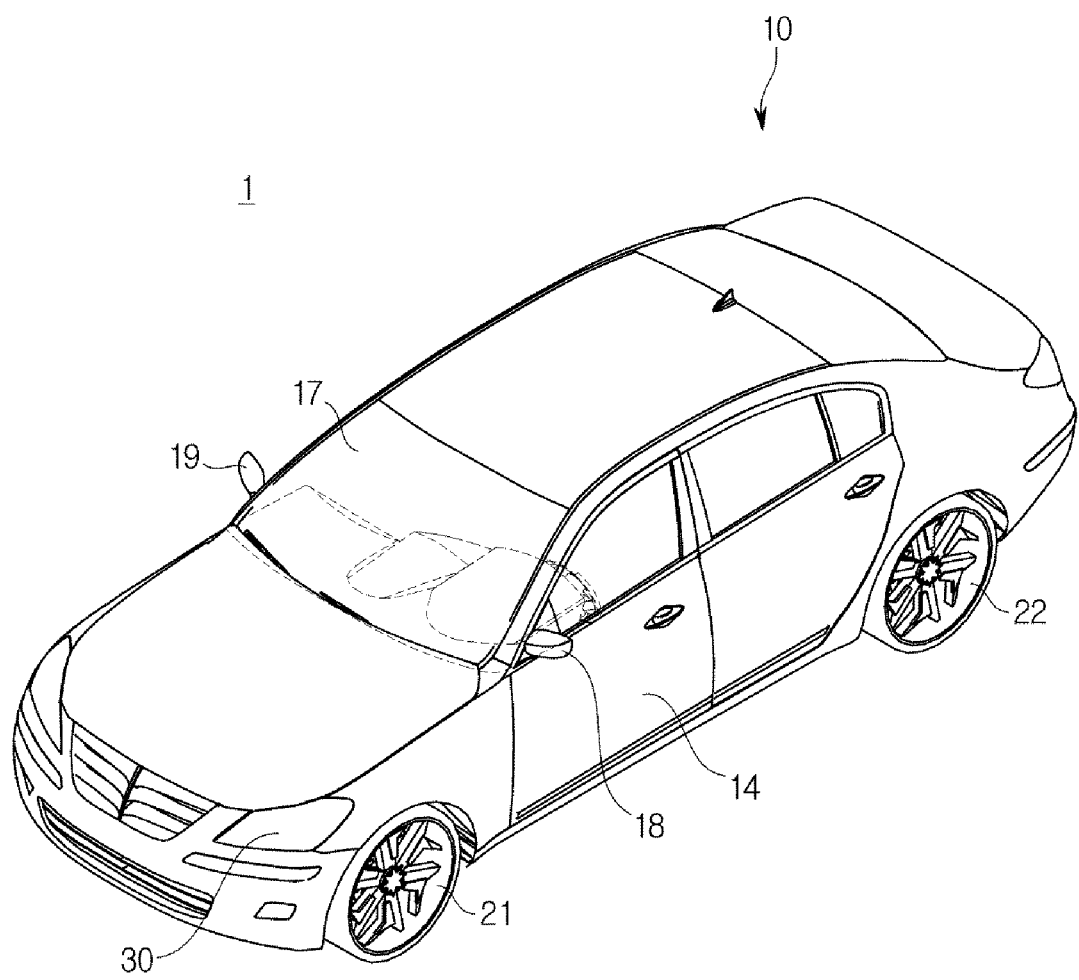
FIG. 1 shows the exterior of a vehicle, according to an embodiment of the present disclosure.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the present invention will now be described with reference to accompanying drawings.

FIG. 1 shows the exterior of a vehicle, according to an embodiment of the present disclosure.

Referring to FIG. 1, a vehicle 1 includes main body 10 forming the exterior of the vehicle 1, wheels 21 and 22 for moving the vehicle 1, doors 14 for shielding the interior of the vehicle 1 from the outside, a front window 17 through which the driver can see a view in front of the vehicle 1, and side mirrors 18, 19 for helping the driver see areas behind and to the sides of the vehicle 1.

The wheels 21 and 22 include front wheels 21 equipped on the front side of the vehicle 1 and rear wheels 22 equipped on the rear side of the vehicle 1, and the front wheels 21 or rear wheels 22 may move the main body 10 forward or backward by turning force received from a driving system, which will be described later.

The doors 14 are pivotally attached onto the left and right sides of the main body 10, and opened for the driver to get in and out of the vehicle 1 and closed for shielding the interior of the vehicle 1 from the outside.

The front glass 17, also termed as a windshield glass, is placed on the top front of the main body 10 for the driver in the vehicle 1 to see a view in front of the vehicle 1.

The side mirrors 18 and 19 include a left side mirror 18 and a right side mirror 19 placed on the left and right sides of the main body 10, respectively, for helping the driver obtain views behind and to the sides of the vehicle 1.

Positions of the side mirrors 18 and 19 may be adjusted by a side mirror control device 243 (see FIG. 3), which will be described later, for the driver in the vehicle 1 to easily obtain the visual information.

Figure 2:
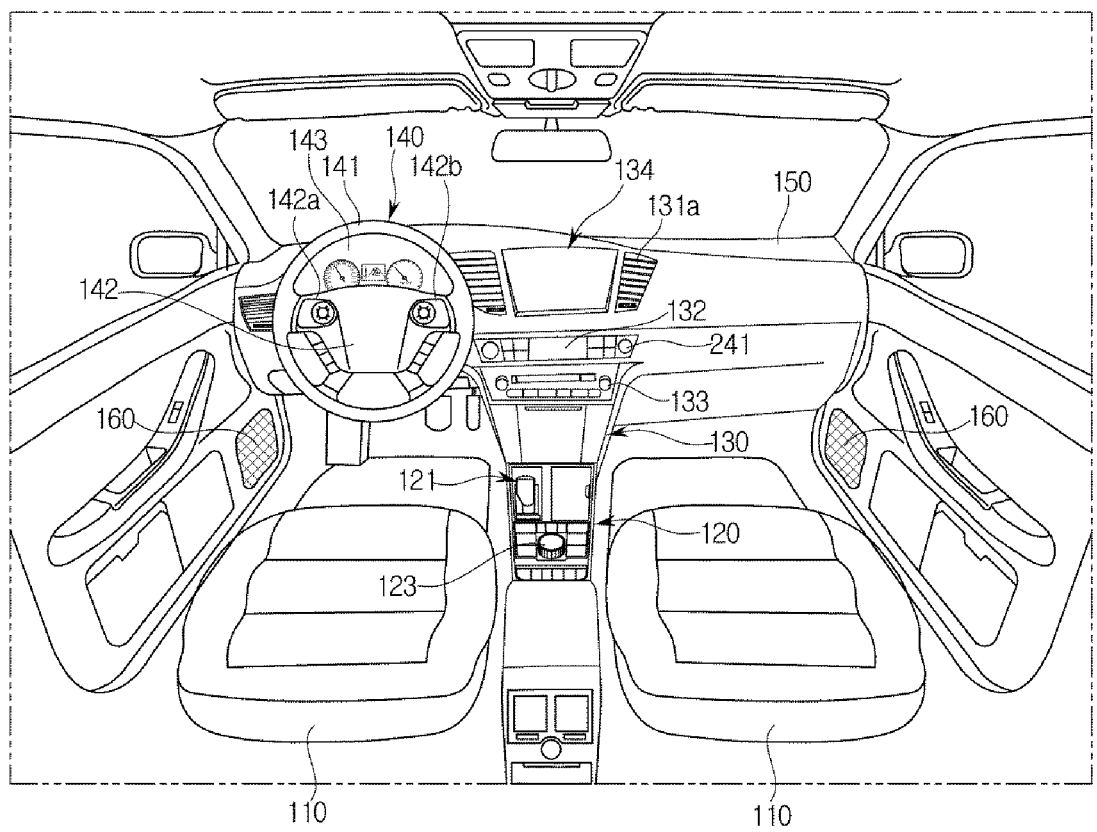
FIG. 2 illustrates internal features of a vehicle, according to an embodiment of the present disclosure.

FIG. 2 illustrates internal features of a vehicle, according to an embodiment of the present disclosure.

Referring to FIG. 2, the vehicle 1 may include seats 110 reserved for driver and passengers to sit on, a gear box 120, a center fascia 130 and a dashboard 150 having a steering wheel 140.

Furthermore, the vehicle 1 may further include an instrument panel (i.e., cluster 143) located on the dashboard 150 and including a speedometer, a tachometer, a water temperature indicator, a fuel gauge, a turn signal indicator, a high beam indicator, a warning lamp (idiot light), a seatbelt warning lamp, an odometer, a treachometer, an automatic gearshift level indicator, a door-open warning lamp, an oil warning light, a low fuel warning light, etc.

The cluster 143 may be digitally implemented. The digital cluster 143 displays vehicle information and driving information in images. The cluster 143 may also display information regarding the user of the vehicle 1 in images. This will be described later in detail.

In the gear box 120, a gearshift 121 for shifting gears of the vehicle 1, and a dial 123 for controlling to perform functions of the vehicle 1 may be installed.

The dial 123 may be used as an input device (not shown) for receiving commands to operate various functions of the vehicle 1, and may include at least one mechanical button, such as ON/OFF buttons for operation of various functions, buttons to change settings of various functions, etc.

The input device may send the button-operated signal to an electronic control unit (ECU) or an Audio Video and Navigation (AVN) system.

The input device may include a touch panel integrated into the display 134, and may further include a jog dial (not shown) or a touch pad for the user to input a command to move or select a cursor displayed on the display of the AVN system. The jog dial or touch pad may be arranged on the center fascia 130.

The steering wheel 140 equipped on the dashboard 150 is a tool to control a traveling direction of the vehicle 1, and may include a rim 141 to be held by the driver and a spoke 142 connected to a steering system of the vehicle 1 for connecting the rim 141 to a hub of a rotation shaft for steering.

In an embodiment, control devices 142a, 142b may be formed on the spoke 142 to control various devices in the vehicle 1, e.g., the audio system.

A detector 210 (see FIG. 3) may be arranged on the steering wheel 140, which will be described later.

In the center fascia 130 arranged on the dashboard 150, an air conditioner 241, a clock 132, an audio system 133, a display 134, and the like may be installed.

The air conditioner 241 keeps the atmosphere inside the vehicle 1 pleasant by controlling temperature, humidity, air cleanness, and air flows inside the vehicle 1. The air conditioner 241 may include at least one vent 131a installed in the center fascia 130 for venting air. There may also be buttons or dials installed in the center fascia 130 to control e.g., the air conditioner 241. A person in the vehicle 1, e.g., the driver, may control the air conditioner 241 with the buttons arranged on the center fascia 130.

The clock 132 may be arranged around the buttons or dials for controlling the air conditioner 241.

The audio system 133 may include a control panel on which a number of buttons are arranged to perform functions of the audio system 133. The audio system 133 may provide a radio mode for radio listening and a media mode for reproducing audio files stored in various storage media. The sound reproduced by the audio system 133 may be output through a speaker 160 provided inside the vehicle 1.

The display 134 may display a user interface (UI) that provides the driver with information regarding the vehicle 1 in the form of images or text. For this, the display 134 may be provided by being buried in the center fascia 130. However, an example of how to install the display is not limited thereto. For example, the display 134 may be provided separately from the center fascia 130 of the vehicle 1.

Furthermore, the display 134 may display various control screens related to control of devices installed in the vehicle 1. For example, the display 134 may display various control screens related to control of the air conditioner 241, the seats 110, and the side mirrors 18, 19.

In addition, the display 134 may be used for the navigation system that may perform integrated audio, video, and navigation functions to correspond to an audio, video, navigation (AVN) system.

The speaker 160 for outputting sounds may be equipped inside the vehicle 1. Accordingly, the vehicle 1 may output the sound required in performing audio, video, navigation, and other additional functions through the speaker 160. In an embodiment, the navigation system may provide not only the information regarding the temperature in the vehicle 1 but also an operation status of the air conditioner 244 to the user through the speaker 160.

When it comes to such various electronic devices of the vehicle 1 providing various functions to the user, it is important to provide the function to be customized for individual users.

There may be multiple users of the vehicle 1, and the set values that are fit for the users may be different depending on the individual users. Especially, since physical conditions of the users are different, providing a customized function for each user may be important while the user is behind the wheel.

The vehicle 1 providing functions customized for individual physical conditions will now be described in connection with FIGS. 3 to 6.

Figure 3:
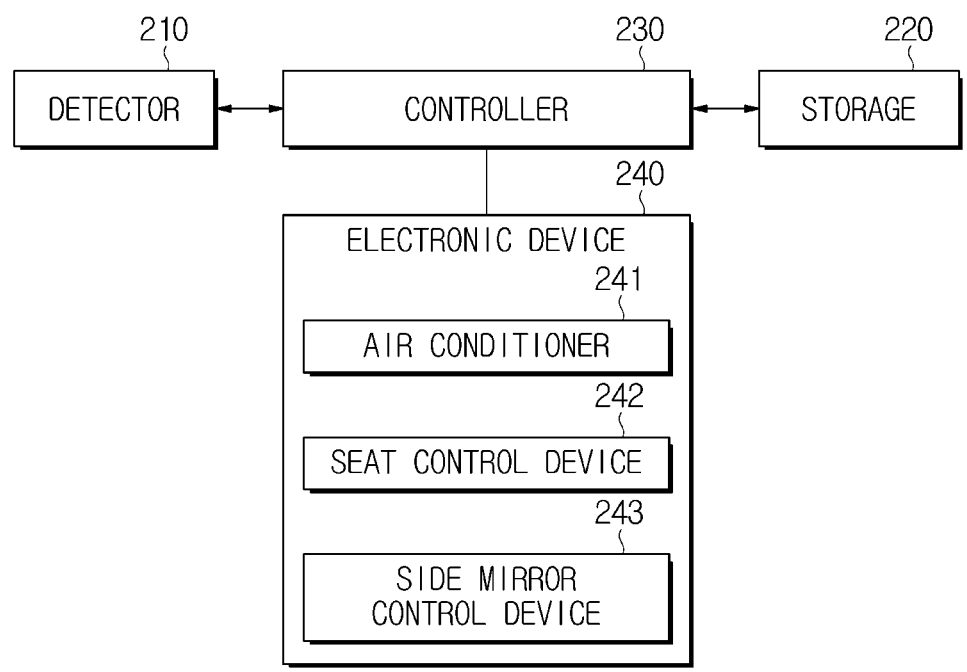
FIG. 3 is a control block diagram of a vehicle, according to an embodiment of the present disclosure.
Figure 5:
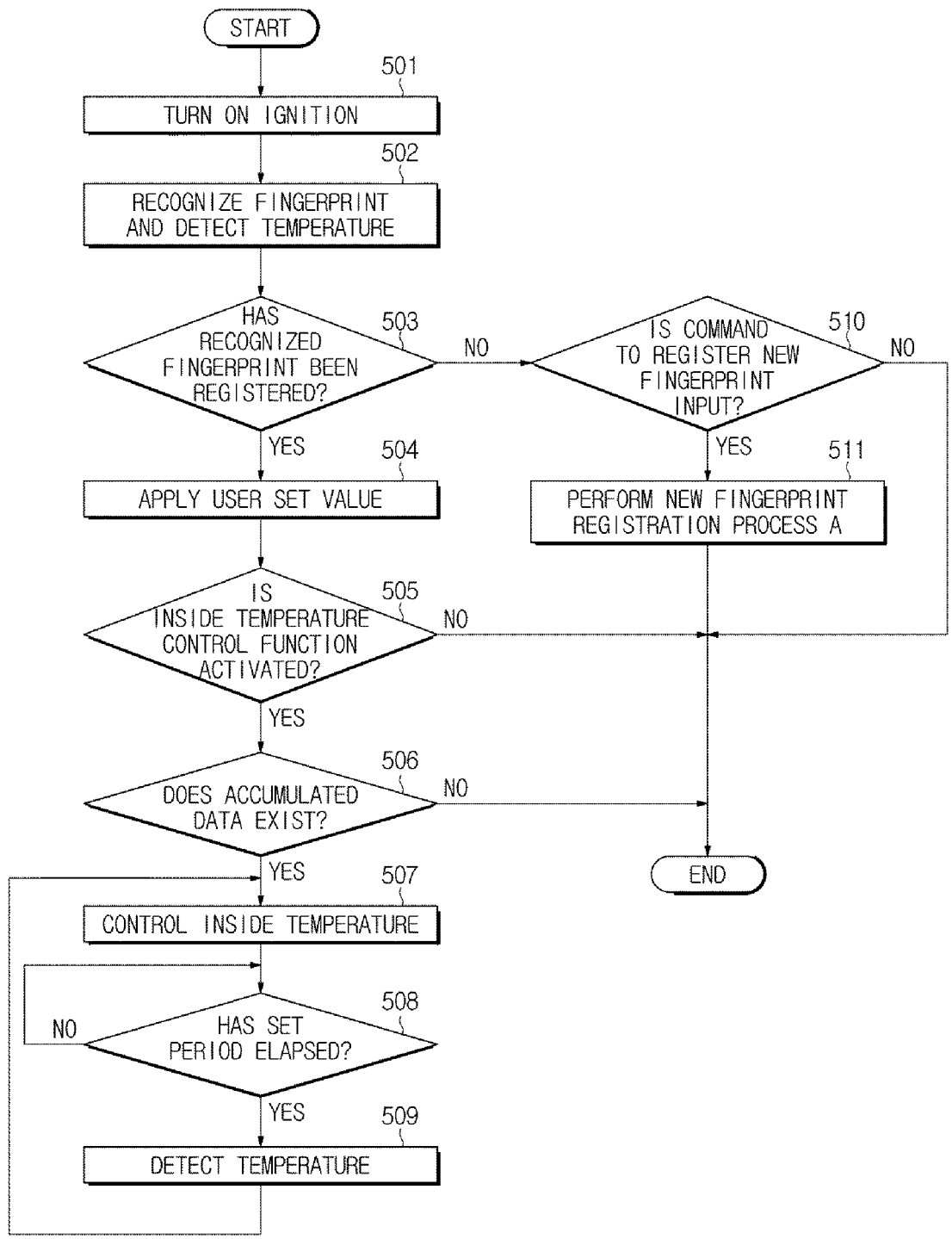
FIG. 5 is a flowchart illustrating a control method of a vehicle, according to an embodiment of the present disclosure.
Figure 6:
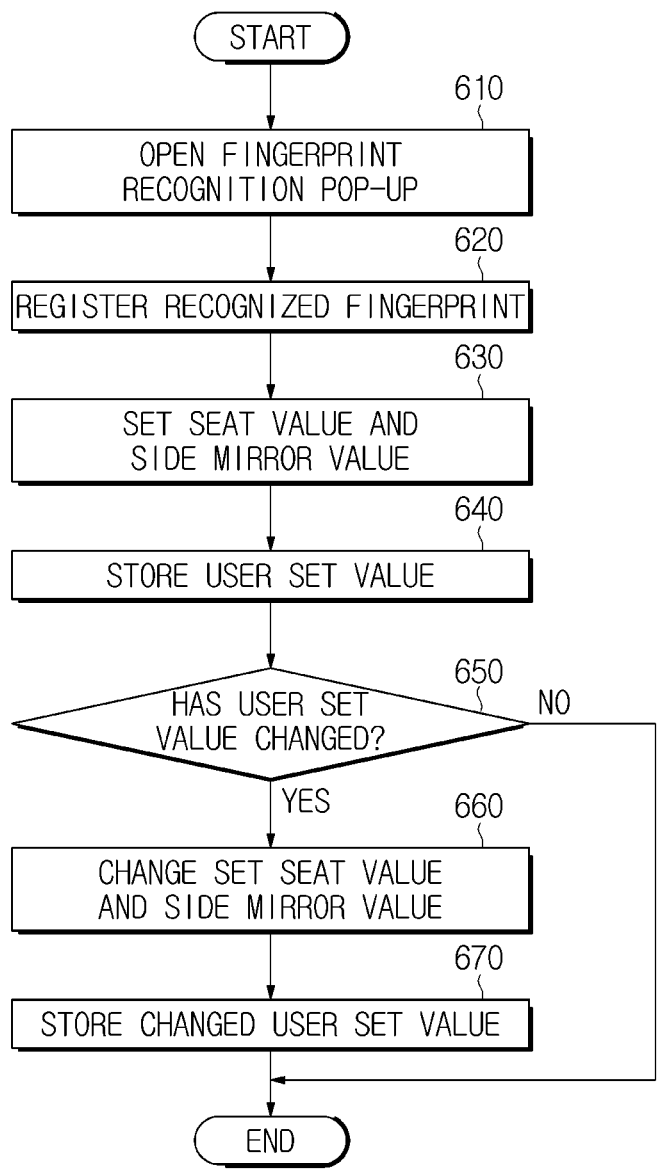
FIG. 6 is a flowchart illustrating a control method of a vehicle, according to another embodiment of the present disclosure.

FIG. 3 is a control block diagram of a vehicle, according to an embodiment of the present disclosure, and FIG. 4 shows front and rear views of a steering wheel of a vehicle, according to an embodiment of the present disclosure. FIGS. 5 and 6 are flowcharts illustrating a control method of a vehicle, according to embodiments of the present disclosure.

Referring to FIG. 3, the vehicle 1 in accordance with an embodiment of the present disclosure may include a detector 210, a storage medium 220, an electronic device 240, and a controller 230.

The detector 210 may recognize a user's fingerprint and detect the temperature of the user's finger.

The detector 210 may also create image information of the recognized fingerprint in various ways. For example, the detector 210 may create an image of the fingerprint in various methods, such as an optical method, a semiconductor device method for detecting capacitance or electric conductance, an ultrasonic method, a heat detection method, a noncontact method or a combination thereof.

The fingerprint recognized by the detector 210 and the resultant fingerprint image may be used as the control basis for the controller 230.

The detector 210 may also detect the temperature of the user's finger while recognizing the fingerprint of the user. Similar to the recognized fingerprint information, the detected temperature may also be used as the control basis for the controller 230, which will be described later.

For this, the detector 210 may be implemented with various sensors. For example, the detector 210 may be implemented with sensors including a fingerprint recognition sensor and a temperature sensor.

In an embodiment, the detector 210 may be implemented with a contact type temperature sensor that makes direct contact with a finger to measure the temperature of the finger.

Figure 4A:
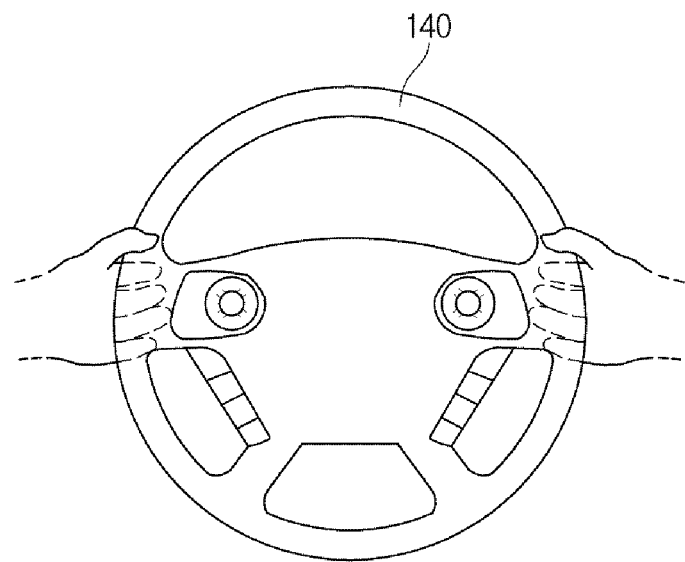
FIG. 4A and FIG. 4B, shows front and rear views of a steering wheel of a vehicle, according to an embodiment of the present disclosure.
Figure 4B:
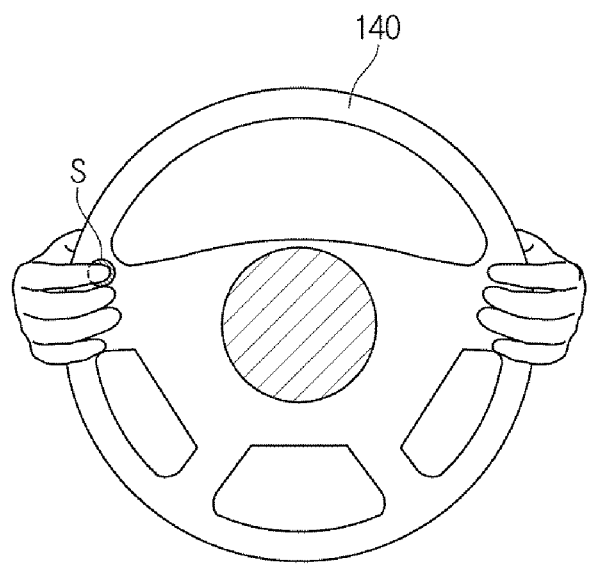

FIG. 4A is a front view of a steering wheel of a vehicle, according to an embodiment of the present disclosure, and FIG. 4B is a rear view of a steering wheel of a vehicle, according to an embodiment of the present disclosure.

As shown in FIG. 4A, the user may grip the steering wheel 140 with both hands. In this case, the user's fingers except the thumb, i.e., the index finger, the middle finger, the ring finger, and the little finger may be likely to come into contact with the rear side of the steering wheel 140.

As shown in FIG. 4B, the user's index finger, middle finger, ring finger, and little finger may contact the rear side of the steering wheel 140, and the detector 210 may be arranged in a portion where the index finger in particular touches.

In an embodiment, the detector 210 may be arranged in a portion where the right index finger touches.

In another embodiment, the detector 210 may be arranged in a portion where the left index finger touches or in a portion where a finger other than the index finger touches, without being limited thereto.

Furthermore, the detector 210 may be formed of a material that feels no difference from the material of the steering wheel for the driver behind the wheel.

Referring to FIG. 3, the storage medium 220 may store a variety of information relating to the vehicle 1.

Specifically, the storage medium 220 may store information about the users' fingerprints detected by the detector 210 and user set values corresponding to the users' fingerprints.

The information about the user set values may include user identification information and information about set values of electronic devices in the vehicle 1 for the identified users, which may be different for each user.

For example, the user set values may include a set value of the air conditioner 241, a set value of the seat 110, i.e., a seat value, a set value of the side mirror 18, 19, i.e., a side mirror value, which are specific to each user.

Furthermore, the storage medium 220 may store information about temperatures of the users' fingers detected by the detector 210 and corresponding inside temperatures of the vehicle 1.

The variety of information stored in the storage medium 220 may be used as the control basis for the controller 230, which will be described later.

The electronic device 240 may provide various functions to the user of the vehicle 1 and include the devices in the vehicle 1 of FIGS. 1 and 2.

For example, the electronic device 240 of the vehicle 1 may include the air conditioner 241, a seat control device 242, and the side mirror control device 243.

The air conditioner 241 may control the inside temperature of the vehicle 1 based on a temperature set value set by the user. The air conditioner 241 was described in connection with FIG. 2, so the description will not be repeated below.

The seat control device 242 may adjust the position of the seat 110.

Furthermore, the seat control device 242 may move the seat 110 to a position having a preset seat value when the driver gets in or out of the vehicle 1 or sits in the seat 110. The seat value that refers to position information of the seat 110 may be sent for the controller 230 to use it as the control basis.

The side mirror control device 243 may adjust the position of the side mirror 18, 19, and may turn the side mirror 18, 19 to adjust the angle of the side mirror 18, 19.

Furthermore, the side mirror control device 243 may adjust the side mirror 18, 19 to a position or posture having a preset side mirror value when the driver gets in or out of the vehicle 1 or turns on the ignition of the vehicle 1. The side mirror value that refers to information about a position or posture of the side mirror 18, 19 may be sent for the controller 230 to use it as the control basis.

The controller 230 may control various electronic devices 240 of the vehicle 1 together with the detector 210 and the storage medium 220. Specifically, the controller 230 may control the air conditioner 241, a seat control device 242, and the side mirror control device 243.

The controller 230 may control the detector 210 to automatically detect the fingerprint of a user and the temperature of the finger when the vehicle 1 is started, and to detect the temperature of the finger at predetermined intervals.

The controller 230 may also identify the user corresponding to the fingerprint recognized by the detector 210. Specifically, the controller 230 may distinguish a fingerprint image created by the detector 210 and identify a user corresponding to the distinguished fingerprint image.

Furthermore, if there is a user set value set by the user identified to correspond to the recognized fingerprint, the controller 230 may control an electronic device inside the vehicle 1 based on the user set value.

Specifically, if there is a preset seat value corresponding to the detected fingerprint among the user set values stored in the storage medium 220, the controller 230 may control the seat control device 242 to move the seat 110 based on the preset seat value.

In addition, if there is a preset side mirror value corresponding to the detected fingerprint among the user set values stored in the storage medium 220, the controller 230 may control the side mirror control device 234 to move the side mirror 18, 19 based on the preset side mirror value.

Otherwise, if there is no user set value corresponding to the detected fingerprint, the controller 230 may provide the user with an image asking whether to register the detected fingerprint.

The controller 230 may provide the user with the image asking whether to register the detected finger print by displaying the image on the cluster 143 or the display 134.

The controller 230 may control an input device (not shown) to receive a command to register the detected fingerprint from the user.

When the command to register the detected fingerprint is input from the user, the controller 230 may perform a new fingerprint registration process A to register the detected fingerprint.

The controller 230 may provide the user with a fingerprint recognition pop-up to register a fingerprint, and the fingerprint recognition pop-up may prompt the user to repeatedly make contact with a sensor included in the detector 210.

Furthermore, the controller 230 may set a seat value and a side mirror value as user set values as soon as the detected fingerprint is registered In this regard, the seat value and the side mirror value may be input directly by the user, or if there is no input from the user, the controller 230 may set and store a seat value and a side mirror value of when the new fingerprint registration process A is performed as the user set values.

After the user set values corresponding to the detected fingerprint are stored, if the set values are changed by the user, the controller 230 may update the stored user set values.

Specifically, the controller 230 may update the stored user set value with a newest value by changing the stored user set value to a changed set value and storing the changed set value.

Furthermore, the controller 230 may store a temperature set value of the air conditioner 241 of when the temperature of the user's finger is detected by the detector 210 as a temperature set value corresponding to the detected temperature.

If there are more than a predetermined number of temperature set value data stored, the controller 230 may control the air conditioner 241 based on the temperature set value corresponding to the detected temperature.

For example, if there are 10 or more temperature set value data corresponding to the detected temperature, the controller 230 may control the air conditioner 241 based on the temperature set value corresponding to the detected temperature.

Specifically, if there are more than a predetermined number of temperature set value data stored in the storage medium 220, the controller 230 may calculate a correlation between temperatures detected within a predetermined range and a corresponding temperature set value based on the stored data. The correlation may be determined by the controller 230 in a formula.

The controller 230 may determine a temperature set vale corresponding to the temperatures detected in the predetermined range based on the correlation, and control the air conditioner 241 according to the determined temperature set value.

For example, the controller 230 may calculate a correlation between temperatures detected in a range from 26° C. to 27° C. (or from 78° F. to 81° F.) and a corresponding temperature set value in a formula.

If no temperature in the predetermined range is detected and thus, the temperature set value corresponding to the detected temperature may not be determined, the controller 230 may not perform automatic temperature control for the air conditioner 241.

For example, if all of a number of the temperature set value data corresponding to the detected temperature of the finger were created in the summer, all the detected temperature may be in a range e.g., from 27° C. to 28° C. (or from 82° F. to 83° F.).

On the contrary, since the finger temperature detected in the winter may be e.g., 25° C. (77° F.), there may not be any temperature set value corresponding to a temperature detected in the winter. Accordingly, in this case, the controller 230 may not perform automatic temperature control for the air conditioner 241 but store temperature set values corresponding to the finger temperature detected in the winter.

Furthermore, the controller 230 may control the air conditioner 241 based on the temperature set value corresponding to the temperature detected by the detector 210 in predetermined cycles.

Specifically, after controlling the air conditioner 241 according to the temperature set value, the controller 230 may control the detector 210 to detect a temperature at predetermined intervals, and if the detected temperature changes, the controller 230 may control the air conditioner 241 based on the temperature set value corresponding to the changed temperature.

Referring to FIG. 5, in an embodiment, if the vehicle 1 turns on the ignition in 501, the vehicle 1 recognizes a fingerprint and detect a temperature in 502 and determines whether the recognized fingerprint has been recognized in 503.

If the recognized fingerprint has been registered, the vehicle 1 applies a user set value corresponding to the detected fingerprint, in 504. Specifically, the vehicle 1 may control the electronic device 240 included in the vehicle 1 according to the user set value corresponding to the detected fingerprint. In this regard, the vehicle 1 may control the seat 110 and the side mirror 18, 19 according to the seat value and the side mirror value.

If the recognized fingerprint has been registered, the vehicle 1 determines whether a function to control the inside temperature is activated, in 504.

If the function to control the inside temperature is activated, the vehicle 1 determines whether there is accumulated data, in 506. The accumulated data may refer to a temperature set value corresponding to the detected temperature, and the vehicle 1 may determine that there is the accumulated data if there are more than a predetermined number of accumulated data.

If it is determined that there is the accumulated data, the vehicle 1 controls the inside temperature according to the temperature set value corresponding to the detected temperature, in 507.

Subsequently, the vehicle 1 determines whether a set period has elapsed in 508, and if the set period has elapsed, detects the temperature of the user's finger in 509, and controls the inside temperature according to the temperature set value corresponding to the re-detected temperature of the finger.

Otherwise, if it is determined that the recognized fingerprint has not been registered in 503, the vehicle 1 determines whether a new fingerprint registration command is input, in 510.

If the new fingerprint registration command is input, the vehicle 1 performs the new fingerprint registration process A in 511.

In this way, the vehicle 1 may identify the user and set configurations of the vehicle 1 to be customized for the identified user, thereby increasing convenience for the user.

Especially, as the air conditioner may be controlled based on detection of the temperature of the user's finger, the user may drive the vehicle 1 under an environment customized for the physical condition of the user.

Referring to FIG. 6, the vehicle 1 provides a fingerprint recognition pop-up to perform the new fingerprint registration process A, in 610. The fingerprint recognition pop-up refers to an image prompting the user to repeatedly make his/her finger touch a sensor included in the detector 210.

If the user repeatedly touches the sensor with his/her finger through the fingerprint recognition pop-up, the vehicle 1 registers a recognized fingerprint, in 620.

Once the recognized fingerprint is registered, the vehicle 1 sets a seat value and a side mirror value, in 630. In this regard, the vehicle 1 may set a seat value and a side mirror value of when the recognized fingerprint is registered, as user set values corresponding to the recognized fingerprint.

After the seat value and the side mirror value are set, the vehicle 1 stores the user set values, in 640.

Subsequently, the vehicle 1 determines whether the user set value is changed in 650, and change the previously set seat value and side mirror value if the user set value is changed, in 660.

The vehicle 1 stores the changed user set values in 670, thereby updating the stored user set values.

According to embodiments of the present disclosure, a vehicle and control method thereof may provide functions customized for the user, thereby increasing convenience for the user.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A vehicle comprising:
    a detector configured to detect a fingerprint of a user finger, the detector also configured to detect a temperature of the finger at predetermined intervals;
    a storage medium configured to store a user set value corresponding to the detected fingerprint and temperature set value data corresponding to the detected temperature; and
    a controller configured to:
        when a user set value corresponding to the detected fingerprint exists, control an electronic device in the vehicle based on the user set value corresponding to the detected fingerprint and to control an air conditioner based on a temperature set value corresponding to the temperature detected at the predetermined intervals when there are more than a predetermined number of temperature set value data stored; and
        when a user set value corresponding to the detected fingerprint does not exist, register the detected fingerprint based on whether a command to register the detected fingerprint has been input.

2. The vehicle of claim 1, wherein the detector is provided on a steering wheel.

3. The vehicle of claim 1, wherein the storage medium is configured to store a user set value including at least one of a seat value or a side mirror value corresponding to the detected fingerprint; and wherein the controller is configured to control a seat based on a seat value corresponding to the detected fingerprint when the seat value exists and to control a side mirror based on a side mirror value corresponding to the detected fingerprint when the side mirror value exists.

4. The vehicle of claim 1, wherein the controller is configured to calculate a correlation between the detected temperature and the corresponding temperature set value when there are more than a predetermined number of temperature set value data stored.

5. The vehicle of claim 4, wherein the controller is configured to determine a temperature set value corresponding to the detected temperature based on the calculated correlation, and to control the air conditioner based on the determined temperature set value.

6. The vehicle of claim 1, further comprising an input device configured to receive the command to register the detected fingerprint.

7. The vehicle of claim 6, wherein the controller is configured to, when the command to register the detected fingerprint is input, register the detected fingerprint and store a user set value including at least one of a seat value or a side mirror value.

8. The vehicle of claim 1, wherein the controller is configured to update the stored user set value when the user set value is changed.

9. A control method of a vehicle, the control method comprising:
   detecting a fingerprint of a user finger;
   detecting a temperature of the finger at predetermined intervals;
   storing a user set value corresponding to the detected fingerprint and temperature set value data corresponding to the detected temperature;
   controlling an electronic device in the vehicle based on a user set value corresponding to the detected fingerprint when the user set value exists;
   controlling an air conditioner based on a temperature set value corresponding to the detected temperature when there are more than a predetermined number of temperature set value data stored, the air conditioner being controlled based on a temperature set value corresponding to the temperature detected at the predetermined intervals; and
   when there is no user set value corresponding to the detected fingerprint, registering the detected fingerprint based on whether a command to register the detected fingerprint is input.

10. The control method of claim 9, wherein storing the user set value and the temperature set value data comprises storing a user set value including at least one of a seat value or a side mirror value corresponding to the detected fingerprint; and
   wherein the controlling of the electronic device comprises controlling a seat based on a seat value corresponding to the detected fingerprint when the seat value exists and controlling a side mirror based on a side mirror value corresponding to the detected fingerprint when the side mirror value exists.

11. The control method of claim 9, wherein the controlling of the air conditioner comprises calculating a correlation between the detected temperature and the corresponding temperature set value when there are more than a predetermined number of temperature set value data stored.

12. The control method of claim 11, wherein controlling the air conditioner comprises:
   determining a temperature set value corresponding to the detected temperature based on the calculated correlation; and
   controlling the air conditioner based on the determined temperature set value.

13. The control method of claim 9, further comprising receiving the command to register the detected fingerprint.

14. The control method of claim 13, wherein the registering of the detected fingerprint comprises, when the command to register the detected fingerprint is input, registering the detected fingerprint and storing a user set value including at least one of a seat value or a side mirror value.

15. The control method of claim 9, further comprising updating the stored user set value when the user set value is changed.

16. The control method of claim 9, wherein detecting the fingerprint of the user finger and the temperature of the finger comprises detecting a fingerprint of a user and a temperature of the finger when the vehicle is started.

17. A vehicle comprising:
   a vehicle body;
   a vehicle doors attached to the vehicle body;
   a front window facing a front side of the vehicle body;
   an air conditioner;
   a steering wheel within the vehicle body adjacent the front window;
   a temperature detector provided on the steering wheel;
   a storage medium configured to store a temperature set value corresponding to a finger temperature detected by the temperature detector; and
   a controller configured to control the air conditioner based on the temperature set value corresponding to the finger temperature detected by the temperature detector when the temperature set value corresponding to the finger temperature is stored in the storage medium and to register a detected fingerprint corresponding to finger temperature detected by the temperature detector when the temperature set value corresponding to the finger temperature is not stored in the storage medium and a command to register the detected fingerprint has been input.

18. The vehicle of claim 17, wherein the controller is configured to control the detector to detect a temperature of the finger at predetermined intervals and to control the air conditioner based on a temperature set value corresponding to the temperature detected at the predetermined intervals.

19. The vehicle of claim 17, wherein the storage medium is configured to store a plurality of temperature set values corresponding to a plurality of finger temperatures;
   wherein the controller is configured to determine the temperature set value from the plurality of temperature set values corresponding to the detected temperature based on a correlation between the detected temperature and the corresponding temperature set value; and
   wherein the controller is configured to control the air conditioner based on the determined temperature set value.

20. The vehicle of claim 17, wherein the storage medium is configured to store a temperature set value associated with a particular user, the vehicle further comprising a fingerprint detector configured to obtain identity information a user of the vehicle, wherein the controller is configured to control the air conditioner based on the temperature set value associated with the particular user when the user of the vehicle is identified to be the particular user.

\* \* \* \* \*